United States Patent
Schultheiss

(10) Patent No.: US 11,482,770 B2
(45) Date of Patent: Oct. 25, 2022

(54) ANTENNA ARRANGEMENT

(71) Applicant: VEGA GRIESHABER KG, Wolfach (DE)

(72) Inventor: Daniel Schultheiss, Hornberg (DE)

(73) Assignee: VEGA GRIESHABER KG, Wolfach (DE)

( * ) Notice: Subject to any disclaimer, the term of this patent is extended or adjusted under 35 U.S.C. 154(b) by 280 days.

(21) Appl. No.: 16/778,828

(22) Filed: Jan. 31, 2020

(65) Prior Publication Data

US 2020/0251805 A1 Aug. 6, 2020

(30) Foreign Application Priority Data

Feb. 4, 2019 (EP) .................................. 19 155 281

(51) Int. Cl.
*H01Q 1/22* (2006.01)
*G01F 23/284* (2006.01)
*H01Q 19/06* (2006.01)

(52) U.S. Cl.
CPC ........... *H01Q 1/225* (2013.01); *G01F 23/284* (2013.01); *H01Q 19/062* (2013.01)

(58) Field of Classification Search
CPC ........ H01Q 1/225; H01Q 15/02; H01Q 19/06; H01Q 16/062; G01F 23/284
See application file for complete search history.

(56) References Cited

U.S. PATENT DOCUMENTS

| | | | | |
|---|---|---|---|---|
| 4,566,321 A | * | 1/1986 | Zacchio | G01F 23/284 343/753 |
| 4,670,754 A | * | 6/1987 | Zacchio | G01F 23/284 73/290 R |
| 4,950,060 A | * | 8/1990 | Nagasaka | G02B 7/10 359/701 |
| 5,202,692 A | * | 4/1993 | Huguenin | G01S 7/024 250/332 |
| 5,206,658 A | * | 4/1993 | Wokurka | H01Q 25/008 343/781 R |
| 5,307,208 A | * | 4/1994 | Hofbauer | G02B 19/0052 359/671 |

(Continued)

FOREIGN PATENT DOCUMENTS

| | | |
|---|---|---|
| CN | 207528301 U | 6/2018 |
| CN | 208401040 U | 1/2019 |

(Continued)

OTHER PUBLICATIONS

European Intention to Grant dated Dec. 14, 2020 in European Patent Application No. 19155281.9, 30 pages.

*Primary Examiner* — Peter M Bythrow
(74) *Attorney, Agent, or Firm* — Oblon, McClelland, Maier & Neustadt, L.L.P.

(57) ABSTRACT

An antenna arrangement for a sensor for plant automation, including for fill level or limit level monitoring, is provided including a primary radiator configured to emit a radar signal, a first lens configured to focus the radar signal, and at least one second lens configured to optimize the focused radar signal, the second lens being disposed at a distance from the first lens and the primary radiator, providing thermal, electrical, or medial decoupling of the primary radiator and the first lens from the second lens.

15 Claims, 4 Drawing Sheets

(56) References Cited

U.S. PATENT DOCUMENTS

| | | | | |
|---|---|---|---|---|
| 5,770,990 | A * | 6/1998 | Lubbers | G01F 23/284 |
| | | | | 333/252 |
| 7,310,061 | B2 * | 12/2007 | Nagasaku | G01S 13/60 |
| | | | | 342/115 |
| 7,764,221 | B2 * | 7/2010 | Voigtlaender | G01S 7/0235 |
| | | | | 342/147 |
| 7,861,600 | B2 * | 1/2011 | Mayer | H01Q 15/08 |
| | | | | 73/290 R |
| 7,961,140 | B2 * | 6/2011 | Binzer | H01Q 25/002 |
| | | | | 342/175 |
| 8,842,038 | B2 * | 9/2014 | Edvardsson | G01F 23/284 |
| | | | | 342/124 |
| 9,091,584 | B2 * | 7/2015 | Vogt | H01Q 1/225 |
| 9,766,330 | B2 * | 9/2017 | Nagaishi | H01Q 1/42 |
| 10,205,245 | B2 * | 2/2019 | Falk | H01P 1/08 |
| 10,224,597 | B2 * | 3/2019 | Blodt | H01Q 13/02 |
| 10,236,577 | B2 * | 3/2019 | Linkies | H01Q 1/526 |
| 2002/0067314 | A1 * | 6/2002 | Takimoto | H01Q 1/3233 |
| | | | | 343/711 |
| 2003/0132205 | A1 * | 7/2003 | Yamazaki | H01L 21/02422 |
| | | | | 219/121.73 |
| 2006/0139206 | A1 * | 6/2006 | Nagasaku | H01Q 19/062 |
| | | | | 342/115 |
| 2009/0273508 | A1 * | 11/2009 | Binzer | G01S 13/931 |
| | | | | 342/175 |
| 2010/0231436 | A1 * | 9/2010 | Focke | H01Q 15/08 |
| | | | | 342/70 |
| 2012/0169527 | A1 * | 7/2012 | Edvardsson | G01F 23/284 |
| | | | | 342/124 |
| 2020/0271576 | A1 * | 8/2020 | Archier | G02B 3/04 |

FOREIGN PATENT DOCUMENTS

| | | |
|---|---|---|
| DE | 197 55 607 A1 | 8/1998 |
| DE | 10 2008 036 963 A1 | 2/2010 |
| DE | 10 2012 016 120 B4 | 12/2017 |
| EP | 2 930 476 A1 | 10/2015 |

* cited by examiner

ANTENNA ARRANGEMENT

CROSS-REFERENCE TO RELATED APPLICATIONS

This application claims the benefit of the filing date of European Patent Application No. 19 155 281.9, filed on 4 Feb. 2019, the entire content of which is incorporated herein by reference.

TECHNICAL FIELD

The invention relates to an antenna arrangement for plant automation, in particular for fill level or limit level monitoring, and a radar measuring arrangement for plant automation.

BACKGROUND

In process automation, and in particular in the field of fill level monitoring and limit level monitoring as well as pressure measurement technology, antenna arrangements are often used to determine a level or switching point in a vessel. However, at elevated process temperatures, electronic components may not be able to withstand the thermal load. Even in high-pressure applications, where very high pressures act on a lens of the antenna array, plastic lenses of radar sensors may not be able to withstand the pressure acting on them.

SUMMARY

The following embodiments provide for an advantageous antenna arrangement.

One aspect relates to an antenna arrangement for a sensor for plant automation, in particular for level and/or limit level monitoring, which has a primary emitter. The primary emitter may be designed to generate, transmit and/or receive a radar signal. In addition, the antenna arrangement comprises a first lens for focusing the radar signal. Furthermore, the antenna arrangement comprises a second lens to further focus, i.e., optimize the focused radar signal. The second lens is positioned at a distance from the first lens and/or the primary emitter. Thus, a thermal, electrical, and/or medial decoupling of the second lens from the first lens and/or the primary radiator is provided.

This arrangement may have the advantage that the primary emitter as well as the first lens does not need to have high temperature resistant properties, as the second lens may be positioned on the container and is made of a high strength material. This allows the heat flow from the container or monitored object between the second lens and the first lens to be interrupted or significantly reduced, so that the first lens and the primary emitter do not have to be made of a highly resistant material. In addition, this arrangement may have the advantage that the arrangement of the two dielectric lenses allows the microwaves of the primary radiator to be better aligned and a longer focal length to be achieved. In addition, the arrangement may have the advantage that optimum illumination of the lens on the process side, the second lens, may be achieved.

In other words, the antenna arrangement may be divided into a process side and an evaluation side, whereby the process side, which includes the second lens, can withstand high temperatures and/or pressures. The primary radiator and/or the first lens may be located on the evaluation side of the antenna arrangement, whereby both components do not have to withstand high temperatures and/or pressures. The distance between the first and second lenses may be such that the first and second lenses are thermally, electrically, and/or medially decoupled from each other. Depending on the distance between the first and second lenses, the focal length of the first lens and the second lens can be selected in such a way that optimum illumination of both lenses can be achieved. This can be used in particular to achieve the smallest possible aperture angle and to significantly reduce the number of side lobes of the radar signal.

When focusing the radar signal, the radar signal emitted by the primary emitter can be picked up by the first lens, or collected and directed to the second lens, so that an optimum illumination of the second lens may be achieved. When the radar signal is optimized by the second lens, the radar signal projected by the first lens onto the second lens can be aligned so that a desired focal length of the second lens can be achieved. This may have the advantage that a very high focal length can be achieved, which can be particularly advantageous for very large containers, such as silos, which are measured with the antenna arrangement. The optimization may also be an additional optimization of the radar signal. The additional focusing of the radar signal can lead to an improved radar signal. In particular, the sensor may be a radar sensor, which is suitable for detecting a level and/or limit level.

According to an exemplary embodiment, the antenna arrangement comprises a high frequency attenuator, which may be a sidewall of a housing or an extra element, arranged between the first and second lenses. The high frequency attenuator may be set up to suppress side lobes of the radar signal. In other words, a high-frequency attenuator, for example a high-frequency attenuating material such as PEEK with carbon fibre filling or PPS with absorber filling, can be placed between the first lens and the second lens to suppress side lobes of the radar signal and thus improve and/or reduce the so-called ringing of a radar system. Alternatively, self-adhesive mats can be used as high-frequency absorbers, such as ferrite-filled silicones or other high-frequency absorbers. An advantage of this design may be that the arrangement of the high-frequency attenuator additionally suppresses the side lobes, thus significantly increasing the quality of the radar signal.

According to an exemplary embodiment, the high-frequency damper is arranged in an edge area between the first and second lenses in such a way that the high-frequency damper decouples the first lens and/or the primary radiator from the second lens thermally, electrically and/or medially. In particular, the high-frequency damper may be arranged in such a way that it does not form a thermal bridge or similar between the first and second lenses. This allows decoupling the first lens from the second lens. Alternatively or in addition, the RF attenuator can only be mounted at the edge of the antenna array. For example, the RF attenuator may be provided only at the edge of the first and/or second lens, e.g. in a housing wall of the antenna array. Alternatively, the high-frequency damper is arranged in such a way that it also electrically decouples the first and/or second lens from each other, in that the high-frequency damper is constructed and/or arranged in such a way that it does not conduct any electrical currents. The advantage of this arrangement may be that no heat flow can take place between the first and second lenses and/or between the second lens and the primary radiator by means of the high-frequency damper. Another advantage may be that a potential-free connection between the second and the first and/or the primary radiator can be achieved. This not only allows the first lens to be thermally decoupled from the second lens, thus saving highly resistant material, but also improves the quality of the radar signal.

According to an exemplary embodiment, the antenna arrangement comprises a housing, the primary radiator being located in the housing. In addition, the housing can be designed to accommodate and/or form the first lens. In other words, the antenna arrangement comprises a housing in which the primary radiator is located, the first lens being positioned in the side wall of the housing and/or the side wall of the housing forming the first lens. In an exemplary design, the housing can be made of a plastic composite, with part of the housing forming the first lens. This has the advantage that a functional integration can take place, which can result in a cost reduction. Alternatively, the first lens can also be injected into the housing as an insert. The advantage of the housing is that the primary radiator is protected from impurities and humidity, so that a high quality of the radar signal can be guaranteed.

According to an exemplary embodiment the housing comprises an opening in which the first lens is arranged and/or can be arranged. In addition, the housing can be set up to accommodate further components. In other words, the housing can be an electronics cup that has an opening on one side wall in which the first lens is located. The electronic cup can contain the primary emitter and other electronic components. The advantage of this design form is that a standard component such as an electronics cup can be used, so that a cost-saving effect can be achieved as well as simplified handling in assembly.

According to an exemplary embodiment, the primary emitter and the first lens is made in one piece. In other words, the primary emitter is con to the first lens in such a way that it can be considered as one component. The advantage of this design form may be that less installation space is required due to the integration of the two separate components into each other and that contacting the primary radiator is easier.

According to an exemplary embodiment, the primary emitter and the first lens are connected means of a plastic composite. For example, the primary emitter and the first lens may be designed as inserts, for positioning in a mould for moulding the two components. Furthermore, the primary emitter can be connected to the first lens by means of a plastic composite. In other words, the primary emitter and the first lens are designed as a single component using a multi-component injection moulding process. The chip can be moulded with a plastic compound. As an example, the primary emitter and the first lens are inserted as an insert into a plastic injection mold and these are joined together with the help of a plastic composite. This can have the advantage that the assembly time is significantly reduced, as one assembly step can be saved due to the integral production. In addition, the advantage can be generated that the primary emitter as well as at least part of the first lens is protected from contamination and/or moisture by the plastic composite.

According to an exemplary embodiment, the plastic composite has a lower dielectric constant than the first lens. This arrangement may be particularly advantageous for primary radiators that emit a high-frequency radar signal.

According to an exemplary embodiment, the second lens has a longer focal length than the first lens. In other words, the first lens is used to direct the radar signal to the second lens and the second lens is used to direct the radar signal into an example vessel so that the level or limit level can be determined in the example vessel. The advantage of this arrangement may be that, due to the longer focal length of the second lens, especially exemplary containers with a high extension length can be measured better with the antenna arrangement.

According to an exemplary embodiment, the antenna arrangement comprises a third lens. The third lens can be placed between the first and the second lens. In addition, the third lens is designed to increase the distance between the first and second lenses, especially by means of defocusing. In other words, the antenna arrangement may have three lenses, the first lens may be located directly on the primary radiator, and the second lens may be located directly on a measuring vessel or the like. The third lens may be placed between the first and second lenses. This offers, among other things, the possibility to radiate through small openings, since a possible too strong focusing of the first lens can be corrected by means of the third lens. Thus, despite a wide aperture angle, the primary emitter can achieve a long focal length with the combination of three lenses, since the microwaves focused by the first lens can be optimally directed to the second lens with the third lens. Thus the focal length of the entire antenna arrangement can be changed by the third lens. In addition, a large number of lenses can also be placed between the first and second lenses. The large number of lenses, some defocusing and some focusing, can act on the radar signal. The advantage of the large number of lenses can be that a large distance between the first and second lenses can be bridged.

According to an exemplary embodiment, the antenna arrangement comprises an insulator, which is placed and/or can be placed between the first and second lenses. In addition, the insulator may be designed to thermally, electrically, and/or medially decouple the primary radiator and/or the first lens from the second lens. The insulator can be made of a material that does not change the orientation of the radar signals. The arrangement of the isolator can be so advantageous that the first lens can be mounted closer to the second lens with the help of the isolator, which can have a positive effect on the quality of the radar signal. In addition, the insulator can be used to dissipate heat radiation corning out of the second lens, so that the first lens and the primary radiator are less stressed.

According to an exemplary embodiment, the insulator is made of a gas, a solid, a liquid, and/or a fluid. In an exemplary design, the insulator is made of a thermally conductive plastic such as a PA66, PBT and/or PEEK. An advantage of this arrangement may be, among other things, that the heat can be quickly dissipated via the insulator, so that the first lens and/or the primary radiator are less thermally stressed. Alternatively, an insulator made of a gas could also be considered, which reduces the heat flow between the first and second lenses with the help of an air stream or a specifically selected gas.

According to an exemplary embodiment, the second lens is configured to withstand temperatures above 100° C. For example, the second lens can be made of a plastic such as PA66, PTFE, or PEEK, which can have an increased temperature resistance. Alternatively, the second lens can be made of a glass or glass composite designed to withstand temperatures above 100°, especially temperatures above 150-200° C.

According to an exemplary embodiment, the cross-section and/or diameter of the first lens is in a ratio of 1:1 to 1:5 to the cross-section and/or diameter of the second lens. In other words, the second lens can be larger than the first lens. Surprisingly, it was found that at a ratio between 1:2 and 1:4 the side lobe suppression can be at an optimum value, so that a strongly focused radar signal can be provided. In an exemplary design, the diameter of the first lens can be between 2 mm and 10 mm. The diameter of the second lens can be between 10 mm and 50 mm.

According to an exemplary embodiment, the distance between the first and the second lens is in a ratio between 1 and 10 to the cross-section or diameter of the first lens. In an exemplary design, the cross-section of the first lens is 3 mm and the distance between the first and second lenses can be 9 mm. Surprisingly, it was found that the distance between the first and second lenses, with a ratio of 2 to 6 to the cross-section of the first lens, can provide optimal illumination of the second lens, so that a highly focused radar signal can be formed.

According to an exemplary embodiment, the third lens is thermally, electrically, and/or medially decoupled from the second lens. The third lens can be made of the same material as the first lens, thus saving additional material that is resistant to high temperatures.

According to an exemplary embodiment, the first the second lens is rotationally symmetrical. In particular the first and the second lenses may be rotationally symmetrical to an axis, the axis corresponding to the symmetry axis of the first and the second lenses. Alternatively, the first lens may also be rotationally symmetrical to a longitudinal axis of the first lens. In particular, the second lens may be rotationally symmetrical to a longitudinal axis of the second lens. One advantage may be that the mounting of the lenses is simplified by the rotational symmetry, as they can be picked up more easily by gripping arms, for example.

Another aspect relates to a radar measuring arrangement for plant automation, in particular for level and/or limit level monitoring, which comprises a vessel and an antenna arrangement. The container may be equipped to hold a medium. The antenna arrangement may be an antenna arrangement as described above and below. In addition, the antenna arrangement can be set up to determine a level and/or limit level of the medium in the vessel. In an exemplary embodiment, the container contains a highly heated medium, of which the filling or limit level is to be determined. By means of the antenna arrangement and the thermal decoupling of the first and second lenses of the antenna arrangement, the amount of thermally highly resistant material used can be significantly reduced, since the first lens and/or the primary radiator do not have to withstand the high temperatures of the medium.

According to an exemplary embodiment, the container and at least part of the antenna arrangement are thermally, electrically and/or medially decoupled from each other. An advantage of this design may be that the thermal, electrical, and/or media decoupling significantly increases the possible applications of the antenna arrangement. Alternatively, the antenna array can be arranged on a container, a number of containers, and/or a pipe or a bypass.

A further aspect relates to a method for determining a limit level and/or filling level comprising the steps
  Transmitting a radar signal by means of a primary radiator,
  Focusing a radar signal by means of a first lens,
  Optimizing a radar signal by means of a second lens, wherein the first and the second lens are thermally, electrically, and/or medially decoupled from each other.

In other words, the method for determining a level and/or limit level comprises emitting a radar signal onto a first lens, which focuses the radar signal. Focusing may involve directing the radar signal to a second lens, the aim of focusing being to achieve optimum illumination of the second lens. In the radar signal optimization step, the radar signal directed to the second lens is optimized by the second lens directing the radar signal to a target focal length to determine a level and/or limit level using the target focal length.

Features and elements of the antenna array as described above and below may be implemented as corresponding features, elements and steps of the method as described above and below and vice versa.

Another aspect relates to a program element which, when executed by a sensor, in particular a sensor comprising an antenna array, instructs the sensor to perform steps of the procedure as described above and below.

The sensor is, for example, a level radar sensor or, more generally, a radar measuring arrangement.

Another aspect relates to a computer-readable medium on which a program element, as described above and below, is stored.

In the following, embodiments are described with reference to the figures.

BRIEF DESCRIPTION OF THE DRAWINGS

The figures are merely schematic and not true to scale. In the figures, identical, equal-acting, or similar elements are provided with the same reference signs.

DETAILED DESCRIPTION OF EMBODIMENTS

Figure 1:
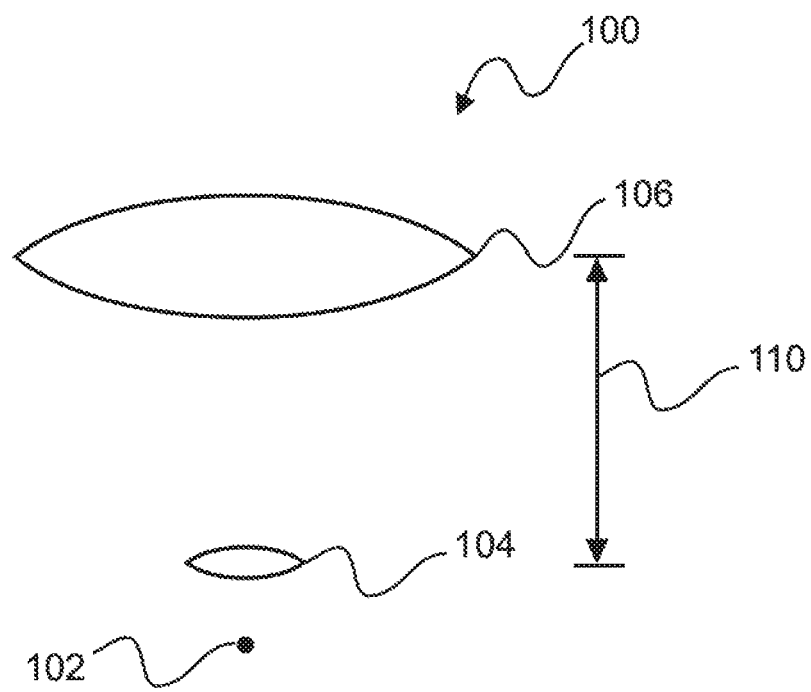
FIG. 1 shows a schematic structure of an antenna arrangement according to an embodiment.

FIG. 1 shows a schematic structure of the antenna array 100, which comprises a primary radiator 102 (also called a primary emitter 102), a first lens 104, and a second lens 106. The first lens 104 is placed at a certain distance 110 from the second lens 106. The primary emitter 102 can emit a radar signal, which can be focused by the first lens 104, so that the second lens 106 can be optimally illuminated by the first lens 104. The second lens 106 can optimize the focused radar signal in such a way that a target focal length is emitted to determine a level and/or limit level. When optimizing the focused radar signal, the radar signal can be additionally focused, so that a better focusing of the radar signal can be achieved. In particular, the second lens can be designed to further focus the focused radar signal.

Figure 2:
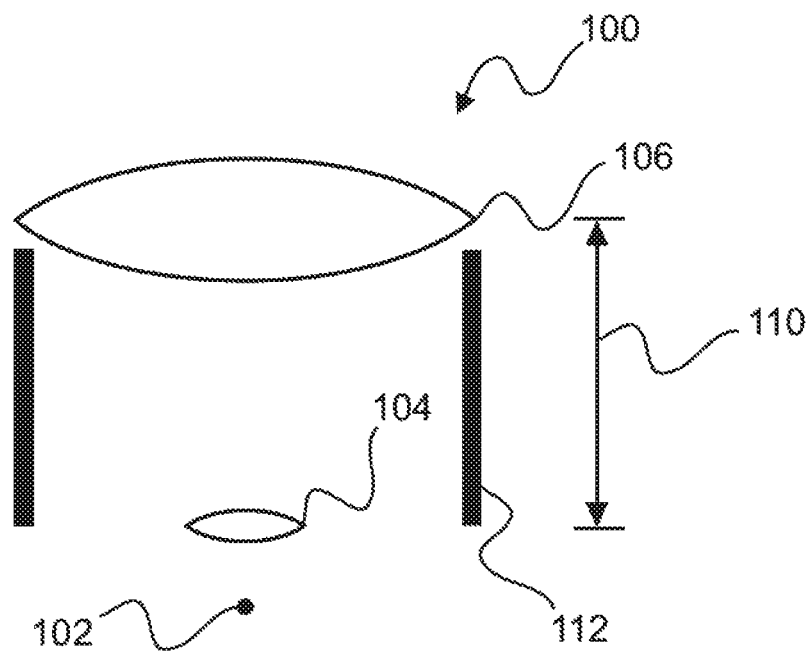
FIG. 2 shows a schematic structure of an antenna arrangement according to an embodiment.

FIG. 2 shows a schematic structure of an antenna array 100 comprising a primary radiator 102, a, first lens 104, and a second lens 106. The first lens 104 and the second lens 106 may be spaced apart by a distance 110. A high-frequency attenuator 112 may be placed between the first lens 104 and the second lens 106 and/or in an edge region outside the space between the lenses. The high-frequency attenuator 112 can be arranged on the outer wall of the antenna array 100. The high-frequency attenuator 112 (or damper) can be used for side lobe suppression.

Figure 3:
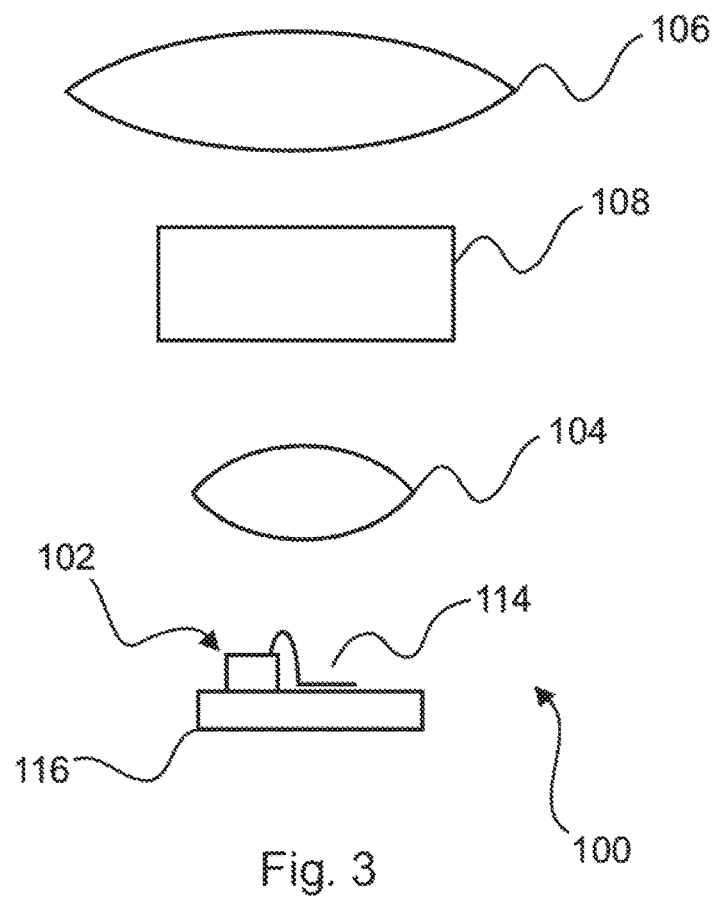
FIG. 3 shows a schematic structure of an antenna arrangement according to an embodiment.

FIG. 3 shows a schematic structure of the antenna array 100 comprising a primary radiator 102, a first lens 104, and a second lens 106, whereby an insulator 108 may be arranged between the first lens 104 and the second lens 106, the insulator 108 being designed to interrupt or reduce the heat flow between the second lens 106 and the first lens 104. In addition, the antenna arrangement 100 may comprise the primary radiator 102, which has an antenna 114 for transmitting and/or receiving a radar signal. The antenna 114 can be arranged on a printed circuit board 116.

Figure 4:
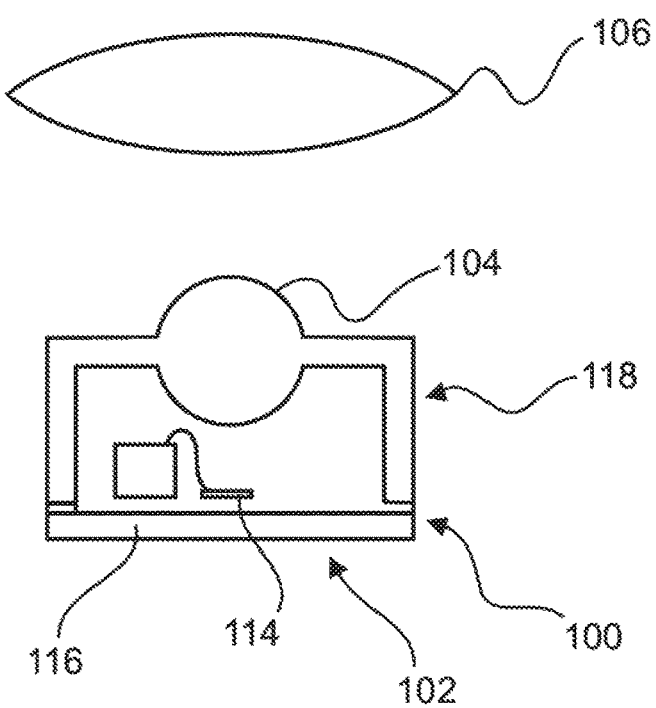
FIG. 4 shows a schematic structure of an antenna arrangement according to an embodiment.

FIG. 4 shows a schematic structure of the antenna array 100. The antenna array 100 can have a housing 118, which accommodates and/or forms the first lens. In addition, the housing 118 can accommodate the primary radiator 102. The primary radiator 102 may comprise an antenna for transmitting and/or receiving a radar signal and a printed circuit board on which the antenna 114 is mounted. The housing 118 can be designed in such a way that the primary radiator, in particular the antenna 114, is protected from contamination and/or moisture.

Figure 5:
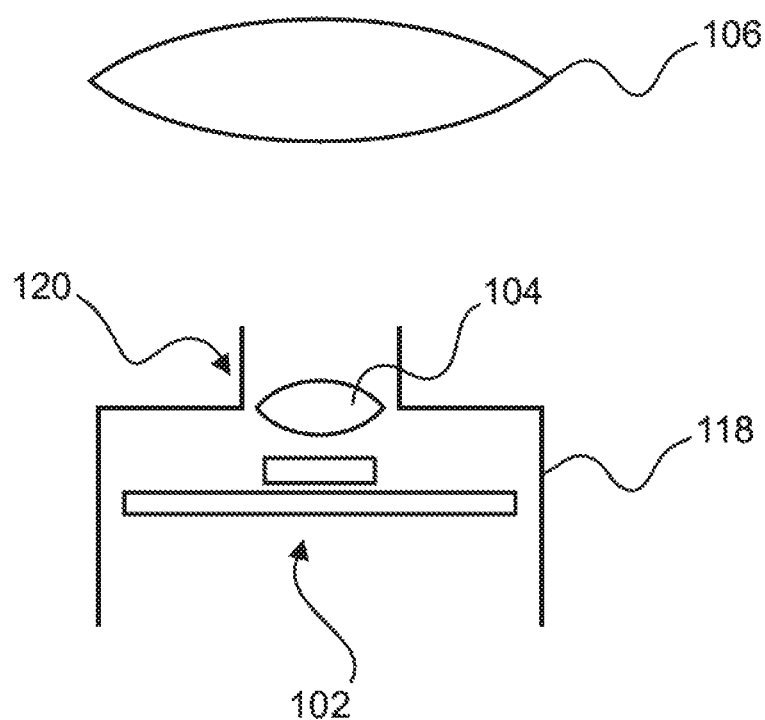
FIG. 5 shows a schematic structure of an antenna arrangement according to an embodiment.

FIG. 5 shows a schematic structure of the antenna arrangement 100, which comprises a housing 118, which may be designed as an electronics cup. The electronics cup may have an opening 120 in which the first lens 104 is located. In addition, the antenna array 100 can have a second lens 106. The second lens 106 can be used to better focus the radar signal. In particular, the primary radiator 102 can be located inside the housing 118 or the electronics cup. In addition, further electronic components, such as an energy storage device, can be arranged in the housing 118 or the electronics cup.

Figure 6:
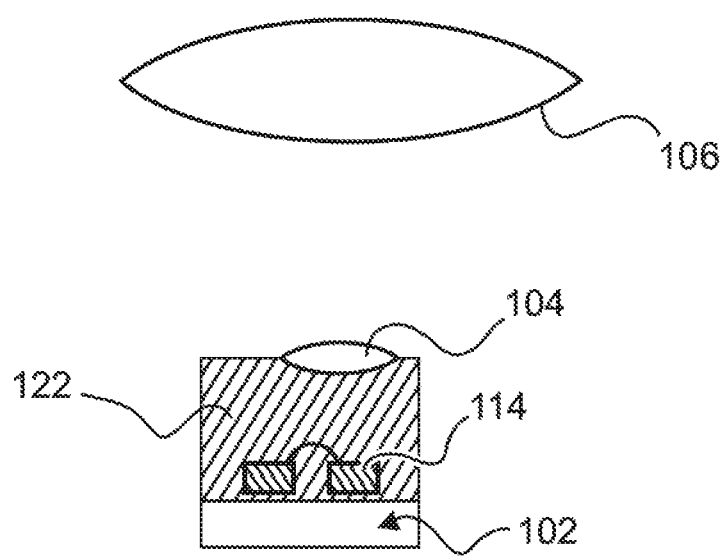
FIG. 6 shows a schematic structure of an antenna arrangement according to an embodiment.

FIG. 6 shows a schematic structure of the antenna arrangement 100, whereby the primary radiator 102 and the first lens 104 are made from one component. The primary radiator 102 and the first lens 104 can be connected to each other by means of a plastic composite 122. The plastic composite 122 can cover the antenna 114. In particular, a one-piece mould of the primary radiator 102 with the first lens 104 can be produced by means of a multi-component injection moulding process. In addition, the antenna arrangement 100 may include a second lens 106, which is spaced apart from the first lens 104.

Figure 7:
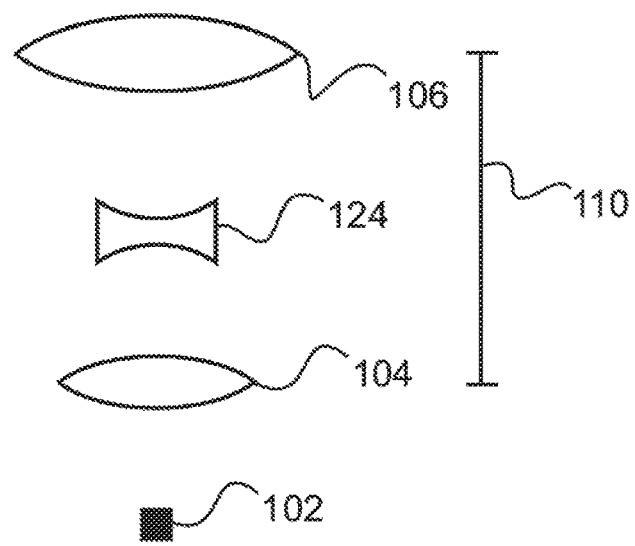
FIG. 7 shows a schematic structure of an antenna arrangement according to an embodiment.

FIG. 7 shows a schematic structure of the antenna arrangement 100, whereby the antenna arrangement comprises a primary radiator 102, a first lens 104, a second lens 106, and a third lens 124. The first lens 104 can be spaced from the second lens 106 at a defined distance 110 from each other. In particular, the third lens 124 can be designed in such a way that a distance 110 between the first lens 104 and the second lens 106 can be increased because the third lens 124 defocuses the radar signal. Thus, with the help of the third lens 124, an optimal illumination of the second lens 106 can be achieved.

Figure 8:
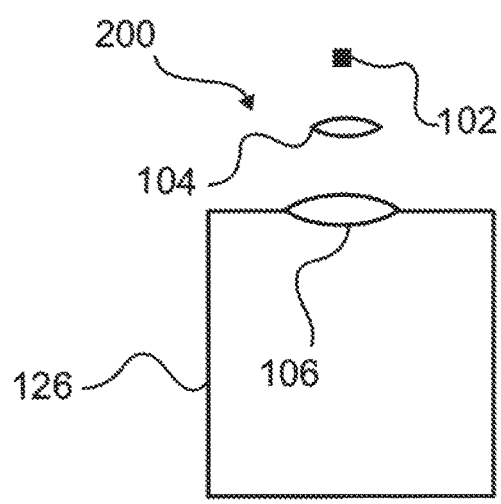
FIG. 8 shows a schematic structure of a radar measuring arrangement according to an embodiment.

FIG. 8 shows a schematic structure of a radar measuring arrangement 200, which has a container 126 on which the second lens 106 is mounted. In addition, the radar measuring arrangement 200 may comprise a primary emitter 102 and a first lens 104, which are spaced apart from the container and/or the second lens 106. The radar measuring arrangement 200 can be designed in such a way that a medium with an elevated temperature is stored in the container 126.

Figure 9:
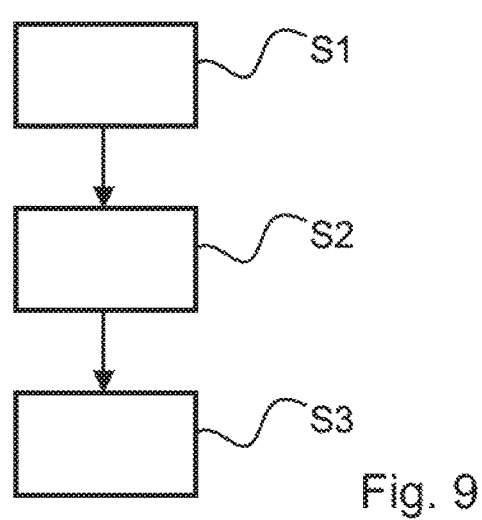
FIG. 9 shows a flowchart illustrating the steps of a method for determining a limit or level according to an embodiment.

FIG. 9 shows a flowchart illustrating steps of a method for determining a limit level or filling level according to an example of the execution of the invention. Unless otherwise described, the method may have the same elements and characteristics as the antenna array as described above and below.

The flowchart comprises the steps Transmit S1, Focus S2, and Optimize S3. The step Transmit S1 relates to the transmission of a radar signal by a primary radiator. In the focusing step S2, the emitted radar signal is focused, in particular using the first lens 104, such that the radar signal is directed to a second lens 106, so that the second lens 106 is illuminated. The step Optimize S3 directs the radar signal to a focal point, and may provide further focusing. Optimization can be done with the second lens 106. In addition, the first lens 104 and the second lens 106 can be thermally, electrically, or medially decoupled from each other, thus saving highly resistant material and increasing the thermal compatibility for the primary radiator.

In addition, it should be noted that comprising and 'having' do not exclude other elements and the indefinite articles "an" and "a" do not exclude a multitude. It should also be noted that characteristics described with reference to one of the above embodiments may also be used in combination with other characteristics of other embodiments described above. Reference signs in the claims are not to be considered as restrictions.

The invention claimed is:

1. An antenna arrangement for a sensor for plant automation, including for fill level or limit level monitoring, comprising:
   a primary radiator configured to emit a radar signal;
   a first lens configured to focus the radar signal;
   at least one second lens configured to optimize the focused radar signal; and
   a high-frequency attenuator disposed in an edge region between the first lens and the second lens,
   wherein the high-frequency attenuator is configured to suppress side lobes of the radar signal, and
   wherein the second lens is disposed at a distance from the first lens and the primary radiator, such that thermal decoupling of the primary radiator and the first lens from the second lens is provided.

2. The antenna arrangement according to claim 1, wherein the high-frequency attenuator is disposed in an edge region between the first lens and the second lens, such that the high-frequency attenuator decouples the first lens and the primary radiator from the second lens thermally, electrically, or medially.

3. The antenna arrangement according to claim 1, further comprising a housing,
   wherein the primary radiator is disposed in the housing, and
   wherein the housing is configured to receive or form the first lens.

4. The antenna arrangement according to claim 3,
   wherein the housing has an opening in which the first lens is disposed, and
   wherein the housing is configured to receive further components.

5. The antenna arrangement according to claim 1, wherein the primary radiator and the first lens are integrally formed.

6. The antenna arrangement according to claim 5, wherein the primary radiator and the first lens are connected to each other by means of a plastic composite.

7. The antenna arrangement according to claim 6, wherein the plastic composite has a lower dielectric constant than that of the first lens.

8. The antenna arrangement according to claim 1, wherein the second lens has a longer focal length than that of the first lens.

9. The antenna arrangement according to claim 1, further comprising a third lens,
wherein the third lens is disposed between the first lens and second lens, and
wherein the third lens is configured to increase the distance between the first lens and the second lens by defocusing.

10. The antenna arrangement according to claim 9, wherein the third lens is thermally, electrically, and/or medially decoupled from the second lens.

11. The antenna arrangement according to claim 1, wherein the first lens and the second lens are rotationally symmetrical.

12. The antenna arrangement according to claim 1, wherein the second lens is configured to withstand temperatures in a range from 100° C. to 250° C.

13. A radar measuring arrangement for plant automation, including for fill level or limit level monitoring, comprising:
a container configured to contain a medium; and
an antenna arrangement according to claim 1,
wherein the antenna arrangement is configured to determine a filling level or limit level of the medium in the container.

14. A method for determining a limit or level, comprising:
emitting a radar signal by means of a primary radiator;
focusing the emitted radar signal by means of a first lens;
suppressing side lobes of the focused radar signal by a high-frequency attenuator disposed in an edge region between the first lens and the second lens; and
optimizing the focused radar signal by means of a second lens,
wherein the first lens and the second lens are thermally, decoupled from each other.

15. The antenna arrangement according to claim 1, wherein the second lens is disposed at a distance from the first lens and the primary radiator, such that electrical or medial decoupling of the primary radiator and the first lens from the second lens is provided.

* * * * *